(No Model.) 2 Sheets—Sheet 1.

T. BLINKHORN.
ROUNDABOUT.

No. 372,296. Patented Nov. 1, 1887.

WITNESSES.
J. Henry Taylor.
James F. Bligh.

INVENTOR.
Thomas Blinkhorn
by Alex. P. Browne
attorney (No Model.) 2 Sheets—Sheet 2.

T. BLINKHORN.
ROUNDABOUT.

No. 372,296. Patented Nov. 1, 1887.

WITNESSES.
J. Henry Taylor.
James P. Bligh.

INVENTOR.
Thomas Blinkhorn
by Alex. P. Browne,
attorney.

UNITED STATES PATENT OFFICE.

THOMAS BLINKHORN, OF BOSTON, COUNTY OF LINCOLN, ENGLAND.

ROUNDABOUT.

SPECIFICATION forming part of Letters Patent No. 372,296, dated November 1, 1887.

Application filed June 9, 1886. Serial No. 204,674. (No model.) Patented in England February 9, 1883, No. 723.

*To all whom it may concern:*

Be it known that I, THOMAS BLINKHORN, of Boston, in the county of Lincoln, and in the Kingdom of Great Britain, have invented certain new and useful Improvements in Roundabouts, (for which I have obtained Letters Patent in Great Britain, dated Feb. 9, 1883, No. 723,) of which the following is a specification.

The improved roundabout is illustrated in the accompanying drawings, in which—

Figure 1:
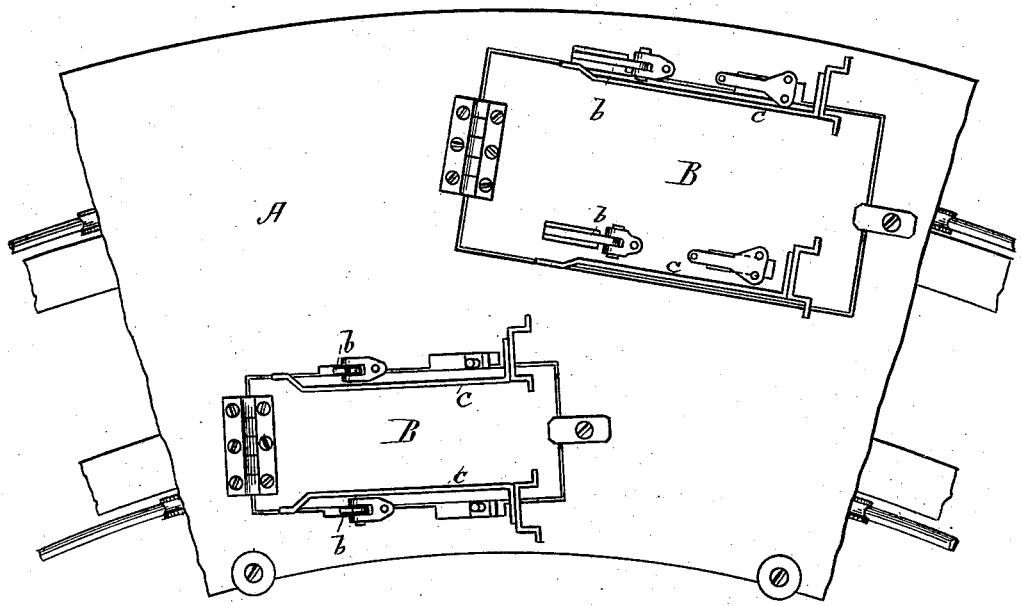
Figure 2:
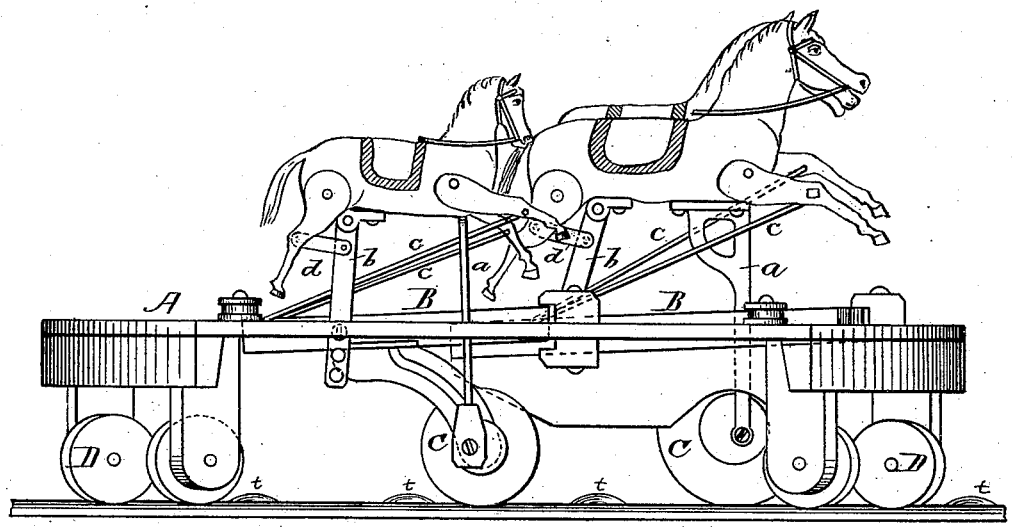
Figure 3:
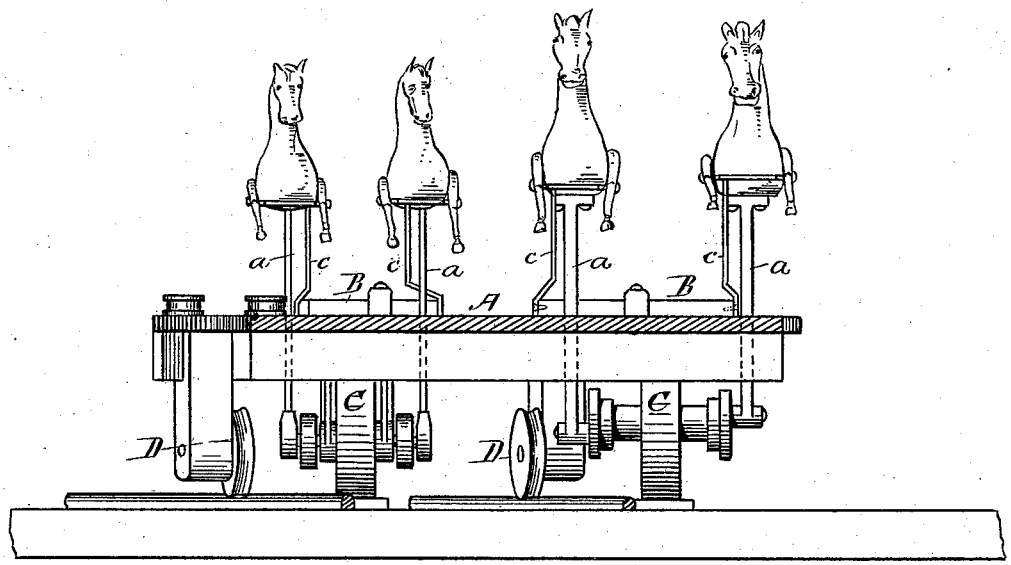

Figure 1 is a plan view of a portion of the frame and connecting parts, with the animals omitted. Fig. 2 is a side elevation of the same, showing the animals in position; and Fig. 3 is an end view of Fig. 2.

The roundabout itself consists of a circular wheeled platform or tramway, preferably formed in sections. Circular motion is imparted to this platform over a suitable circular track by means of a steam-engine or other source of motive power, as may be desired. Upon this platform are mounted figures of horses or other animals, to which, during the revolution of the platform, motions are imparted counterfeiting those of the animals represented, and seats are provided upon the animals in the ordinary manner.

The improvement consists particularly in the construction of the platform and the specific devices for imparting motion to the figures, as will now be described.

Within the revolving platform A, at convenient intervals, are formed similar hinged platforms, B B, upon which the animals are carried. Each platform supports one or more horses or other animals by means of two vertical rods or standards for each animal. One of these rods, $a$, is attached to the body of the animal between the fore legs, while the other, $b$, is pivoted to the body near the hind legs. The lower end of the support $a$ is attached to a crank or eccentric on the axis of a wheel, C, running upon a suitable track, (best shown in Fig. 3,) and the lower end of the rod or support $b$ is pivoted to the platform B.

In order to impart a natural motion to the legs of the animals, they are united to the bodies by pivots, and also pivotally attached to the connecting-rods $c$ at about the knees, which connecting-rods at the other end are pivoted to the platform B. The hind legs, in a similar manner, are connected with the pivoted standards $b$ by means of pivoted rods $d$. (Best shown in Fig. 2.) When the platform A is set in motion, the animals are carried round in a circle, and their bodies are carried up and down, and also forward and back, by means of the connecting-rods or pivoted standards $a$ $b$, while their legs are caused to move by the rods $c$ $d$. If desired, a sudden upward motion, to imitate jumping, may be given to the animals by forming abrupt elevations in the track, as at $t$, on which the wheels C C run. The axles of these wheels are carried in bearings fixed to the platform B on either side, and the axles carry disks and crank-pins for imparting motion to the animals, as shown in Fig. 3. Each platform preferably carries two animals. In addition to the wheels connected with the platform B, other wheels, D, are provided for carrying the main platform A, as shown.

Several concentric platforms and roundabouts may be run from the same motive power, a suitable track being provided for each, and the size and appearance of the animals on the platforms may be varied.

I claim—

1. In a roundabout, the combination, with the main rotary platform A, of the supplemental wheeled platforms B, hinged thereto, and the rods $a$ and $b$, supporting the animal figures, the rod $a$ being attached at its lower end to a crank on the axle of the wheel C, and the rod $b$ being pivoted at its lower end to the platforms B, all substantially as set forth.

2. In a roundabout, the combination of the main platform A, subsidiary wheeled platforms B in hinged connection therewith, figures of animals pivotally mounted upon the said platforms by means of standards $b$, and also eccentrically connected with the platform-wheels C, by means of conecting-rods $a$, and legs pivoted to the bodies of the said animals and provided with connecting-rods $c$ $d$, pivoted at their other ends to the platforms B, as described, whereby motion is imparted to the said legs as well as to the bodies of the animals, all substantially as set forth.

In testimony whereof I have hereunto subscribed my name this 9th day of October, A. D. 1885.

THOMAS BLINKHORN.

Witnesses:
 FRANCIS THOMAS SELBY,
 GEORGE WILLIAM BAILEY.